United States Patent
Huang et al.

(10) Patent No.: US 11,121,825 B2
(45) Date of Patent: Sep. 14, 2021

(54) MAPPING UPLINK CONTROL INFORMATION TO UPLINK DATA CHANNEL IN WIRELESS COMMUNICATION

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 16/192,108

(22) Filed: Nov. 15, 2018

(65) Prior Publication Data
US 2019/0165896 A1  May 30, 2019

Related U.S. Application Data

(60) Provisional application No. 62/590,599, filed on Nov. 26, 2017.

(51) Int. Cl.
| | |
|---|---|
| H04L 5/00 | (2006.01) |
| H04B 7/06 | (2006.01) |
| H04L 1/18 | (2006.01) |
| H04L 1/16 | (2006.01) |

(Continued)

(52) U.S. Cl.
CPC ......... *H04L 1/1819* (2013.01); *H04B 7/0626* (2013.01); *H04L 1/1664* (2013.01); *H04L 5/005* (2013.01); *H04L 5/0051* (2013.01); *H04L 5/0053* (2013.01); *H04L 5/0055* (2013.01); *H04L 5/0057* (2013.01);

(Continued)

(58) Field of Classification Search
CPC ... H04L 5/0057; H04L 5/0051; H04L 5/0053; H04L 7/0626; H04L 5/0055; H04L 1/1819

See application file for complete search history.

(56) References Cited

U.S. PATENT DOCUMENTS

| | | | |
|---|---|---|---|
| 2011/0274059 A1* | 11/2011 | Brown | ................. H04L 5/0092 370/329 |
| 2014/0247799 A1* | 9/2014 | Suzuki | ............. H04W 74/0833 370/329 |

(Continued)

OTHER PUBLICATIONS

International Search Report and Written Opinion—PCT/US2018/061674—ISA/EPO—dated Feb. 12, 2019.

(Continued)

*Primary Examiner* — Faruk Hamza
*Assistant Examiner* — Abusayeed M Haque
(74) *Attorney, Agent, or Firm* — Kevin M. Donnelly

(57) ABSTRACT

Methods and apparatuses are disclosed for multiplexing uplink control information and uplink user data in the same uplink slot. A scheduling entity may use a unified rule to map uplink control information (UCI) in a distributed fashion according to a predetermined step size on each orthogonal frequency division multiplexing (OFDM) symbol regardless of UCI types. The scheduling entity may use a unified rule to partition the UCI into two parts when frequency hopping is enabled, and use the same unified rule to map the UCI in each hop.

18 Claims, 15 Drawing Sheets

(51) Int. Cl.
  *H04W 72/04* (2009.01)
  *H04B 7/0413* (2017.01)

(52) U.S. Cl.
  CPC ....... *H04W 72/0413* (2013.01); *H04B 7/0413* (2013.01); *H04L 5/0012* (2013.01)

(56) References Cited

U.S. PATENT DOCUMENTS

| | | | | |
|---|---|---|---|---|
| 2014/0301324 A1* | 10/2014 | Cheng | .................. | H04L 5/0055 370/329 |
| 2014/0362832 A1* | 12/2014 | Rudolf | ................. | H04L 1/1887 370/336 |
| 2017/0332374 A1* | 11/2017 | Koorapaty | ............ | H04L 1/1812 |
| 2018/0110041 A1* | 4/2018 | Bendlin | .............. | H04W 72/044 |
| 2018/0145818 A1* | 5/2018 | Choi | ............... | H04L 5/0051 |
| 2018/0205525 A1* | 7/2018 | He | ........................ | H04L 5/0055 |
| 2019/0104534 A1* | 4/2019 | Tsai | ................. | H04W 72/1268 |
| 2019/0312678 A1* | 10/2019 | Yokomakura | ......... | H04L 69/324 |
| 2020/0178222 A1* | 6/2020 | Wang | ................... | H04L 5/0007 |
| 2020/0288458 A1* | 9/2020 | Takeda | .................... | H04L 27/26 |
| 2020/0359371 A1* | 11/2020 | Takeda | ................. | H04W 16/28 |
| 2020/0374917 A1* | 11/2020 | Takeda | ................. | H04W 72/04 |

OTHER PUBLICATIONS

LG Electronics: "UCI on PUSCH and UL Channel Multiplexing for NR", 3GPP Draft, R1-1719927, 3rd Generation Partnership Project (3GPP), vol. RAN WG1, No. Reno, USA, Nov. 27, 2017-Dec. 1, 2017, Nov. 18, 2017 (Nov. 18, 2017), XP051369640, 17 Pages, Retrieved from the Internet: URL:http://www.3gpp.org/ftp/tsg%5Fran/WG1%5FRL1/TSGR1%5F91/Docs/ [retrieved on Nov. 18, 2017].

Qualcomm Incorporated: "Multiplexing of PUCCH and PUSCH", 3GPP Draft, R1-1720685 Multiplexing of PUCCH and PUSCH, 3rd Generation Partnership Project (3GPP), vol. Ran WG1, No. Reno, USA, Nov. 27, 2017-Dec. 1, 2017, Nov. 18, 2017 (Nov. 18, 2017), XP051370146, pp. 1-10, Retrieved from the Internet: URL: http://www.3gpp.org/ftp/tsg%5FranWG1%5FRL1/TSGR1%5F91/Docs/ [retrieved on Nov. 18, 2017].

* cited by examiner

MAPPING UPLINK CONTROL INFORMATION TO UPLINK DATA CHANNEL IN WIRELESS COMMUNICATION

PRIORITY CLAIM

This application claims priority to and the benefit of provisional patent application No. 62/590,599 filed in the United States Patent and Trademark Office on Nov. 26, 2017, the entire content of which is incorporated herein by reference as if fully set forth below in its entirety and for all applicable purposes.

TECHNICAL FIELD

The technology discussed below relates generally to wireless communication systems, and more particularly, to multiplexing uplink control information and uplink data channel transmissions.

BACKGROUND

In wireless communication, a user equipment (UE) may communicate with a wireless network via a radio interface using various "channels". A UE may transmit uplink (UL) control information using one or more dedicated UL control channels, such as a physical uplink control channel (PUCCH) or the like. The UE may also transmit UL user data using one or more UL shared data channels, such as a physical uplink shared channel (PUSCH). In some wireless networks, like 5G New Radio (NR), a UE can multiplex simultaneous PUCCH and PUSCH transmissions in a same slot.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure provides a method of wireless communication. A wireless communication apparatus modulates uplink control information (UCI) including a plurality of control information types, to generate a plurality of modulated UCI symbols. The apparatus maps the plurality of modulated UCI symbols to a plurality of resource elements (REs) of a physical uplink shared channel (PUSCH) such that the modulated UCI symbols of each control information type are distributed according to a predetermined step size among the REs of one or more corresponding orthogonal frequency division multiplexing (OFDM) symbols of the PUSCH. The apparatus transmits data in the PUSCH including the UCI.

Another aspect of the disclosure provides an apparatus that includes a communication interface configured for wireless communication and a communication circuit. The communication circuit is configured to modulate uplink control information (UCI) including a plurality of control information types, to generate a plurality of modulated UCI symbols. The communication circuit is further configured to map the plurality of modulated UCI symbols to a plurality of resource elements (REs) of a physical uplink shared channel (PUSCH) such that the modulated UCI symbols of each control information type are distributed according to a predetermined step size among the REs of one or more corresponding orthogonal frequency division multiplexing (OFDM) symbols of the PUSCH. The communication circuit is further configured to transmit data in the PUSCH including the UCI using the communication interface.

Another aspect of the disclosure provides an apparatus for wireless communication. The apparatus includes means for modulating uplink control information (UCI) comprising a plurality of control information types, to generate a plurality of modulated UCI symbols. The apparatus further includes means for mapping the plurality of modulated UCI symbols to a plurality of resource elements (REs) of a physical uplink shared channel (PUSCH) such that the modulated UCI symbols of each control information type are distributed according to a predetermined step size among the REs of one or more corresponding orthogonal frequency division multiplexing (OFDM) symbols of the PUSCH. The apparatus further includes means for transmitting data in the PUSCH including the UCI.

Another aspect of the disclosure provides a computer-readable storage medium that stores executable code. The executable code causes a computer to modulate uplink control information (UCI) comprising a plurality of control information types, to generate a plurality of modulated UCI symbols. The executable code further causes a computer to map the plurality of modulated UCI symbols to a plurality of resource elements (REs) of a physical uplink shared channel (PUSCH) such that the modulated UCI symbols of each control information type are distributed according to a predetermined step size among the REs of one or more corresponding orthogonal frequency division multiplexing (OFDM) symbols of the PUSCH. The executable code further causes a computer to transmit data in the PUSCH including the UCI using a communication interface.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide methods and apparatuses for multiplexing uplink control information and uplink user data in the same uplink slot. In one aspect of the disclosure, a scheduling entity may use a unified rule to map uplink control information (UCI) in a distributed fashion according to a predetermined step size on each OFDM symbol regardless of UCI types. In another aspect of the disclosure, the scheduling entity may use a unified rule to partition the UCI into two parts when frequency hopping is enabled, and use the same unified rule to map the UCI in each hop.

Figure 1:
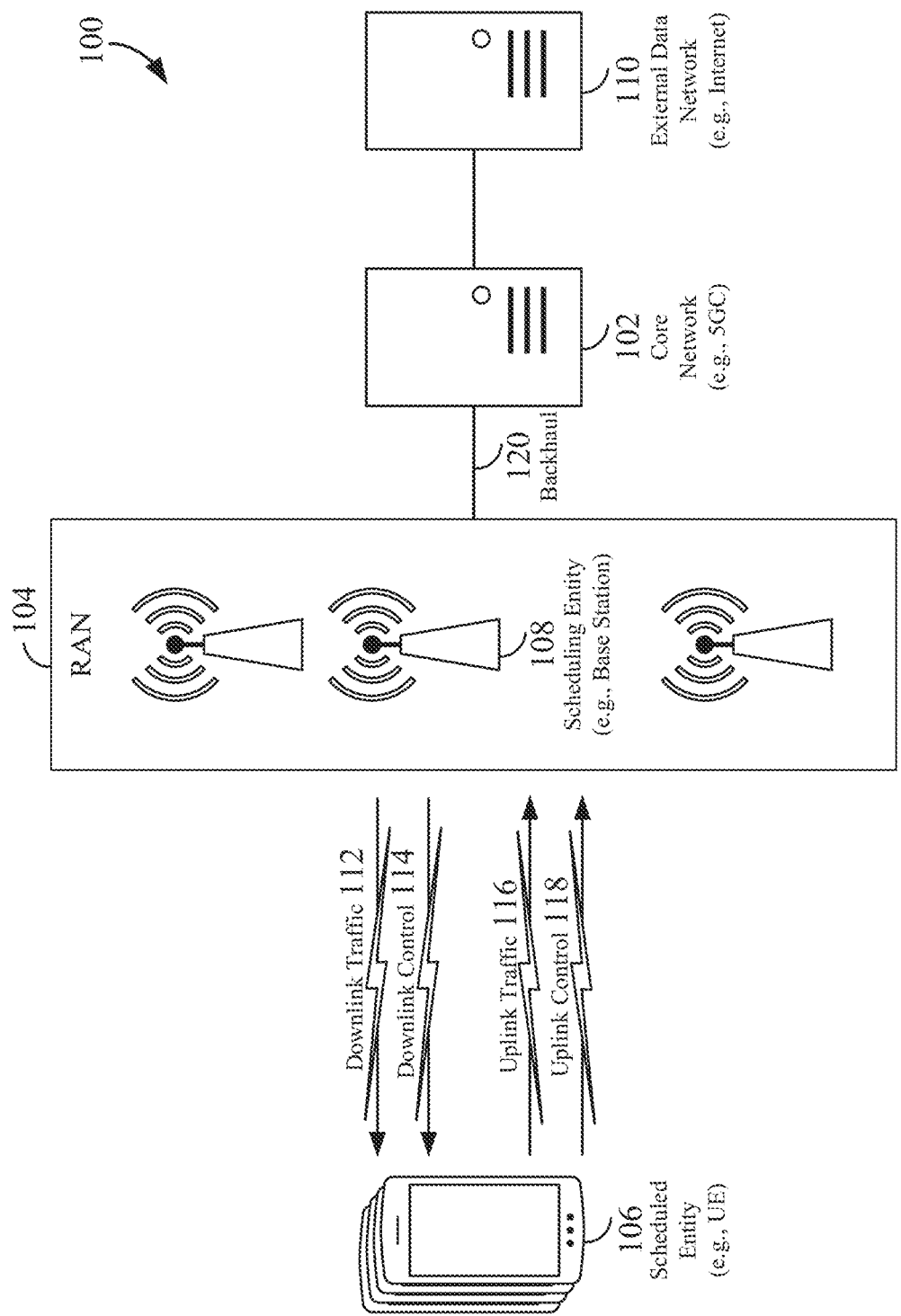
FIG. 1 is a conceptual diagram illustrating an example of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE or 4G. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some nonlimiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
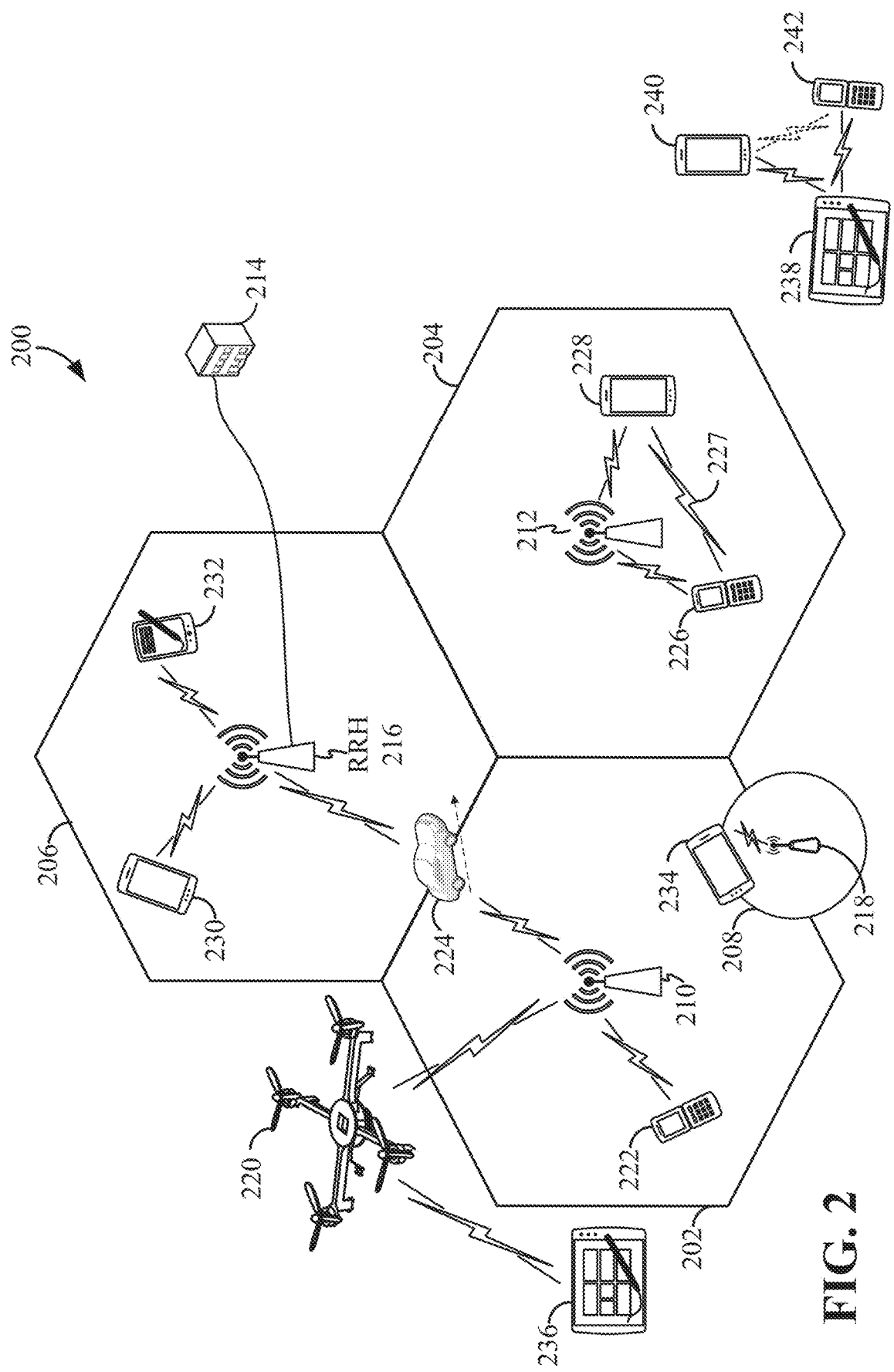
FIG. 2 is a conceptual diagram illustrating an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station (e.g., eNB or gNB). FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
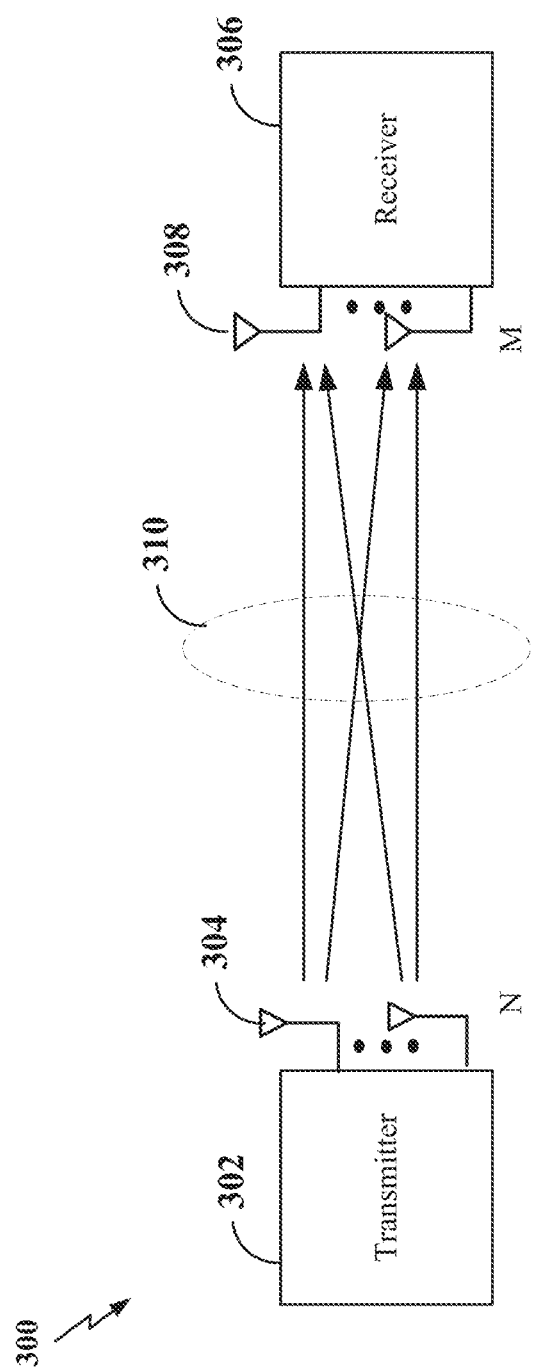
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back a channel quality indicator (CQI) and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe (e.g., 1 ms subframe 402) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
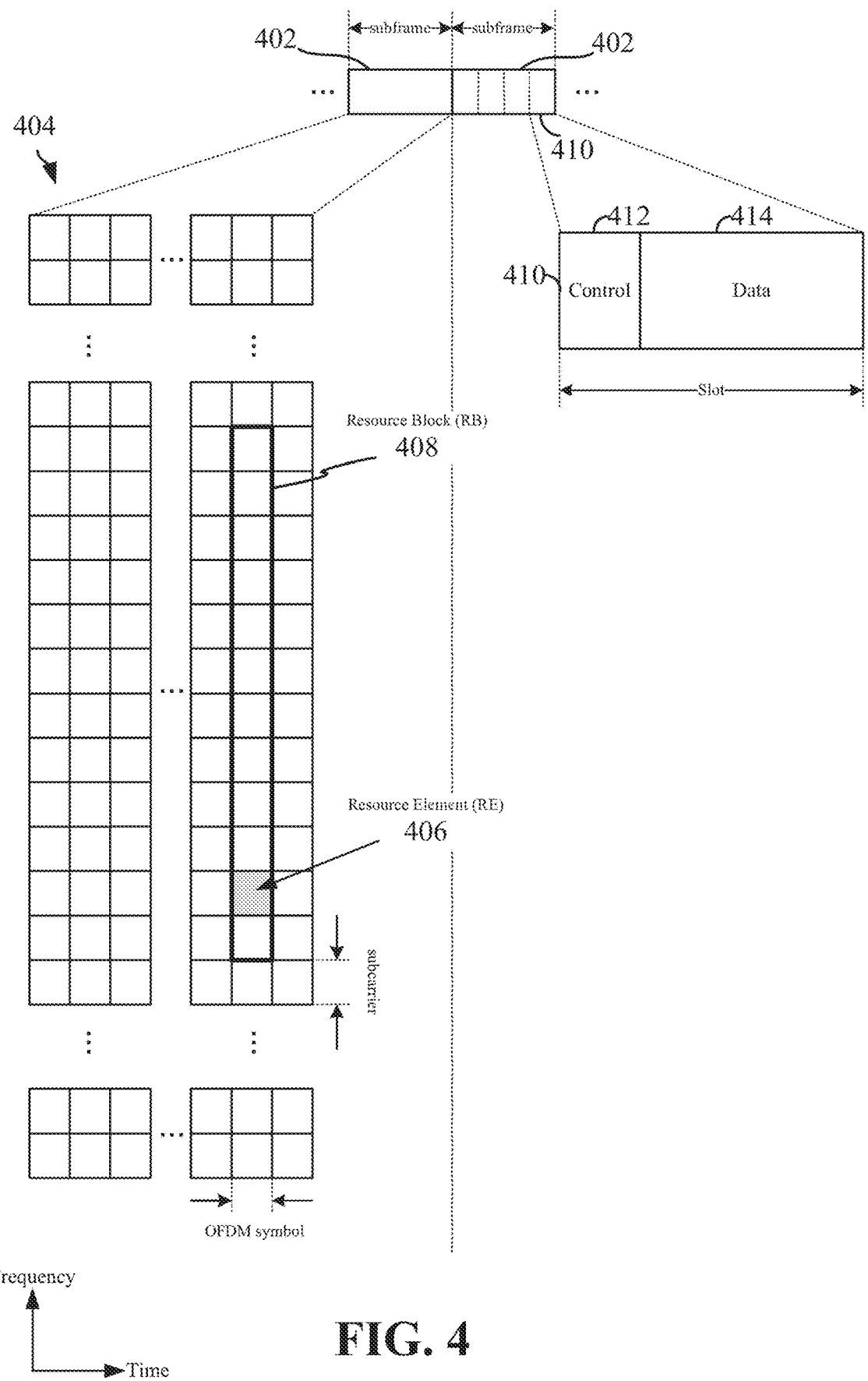
FIG. 4 is a schematic diagram illustrating organization of wireless resources in an air interface utilizing orthogonal frequency division multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 406 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), channel state information (CSI), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
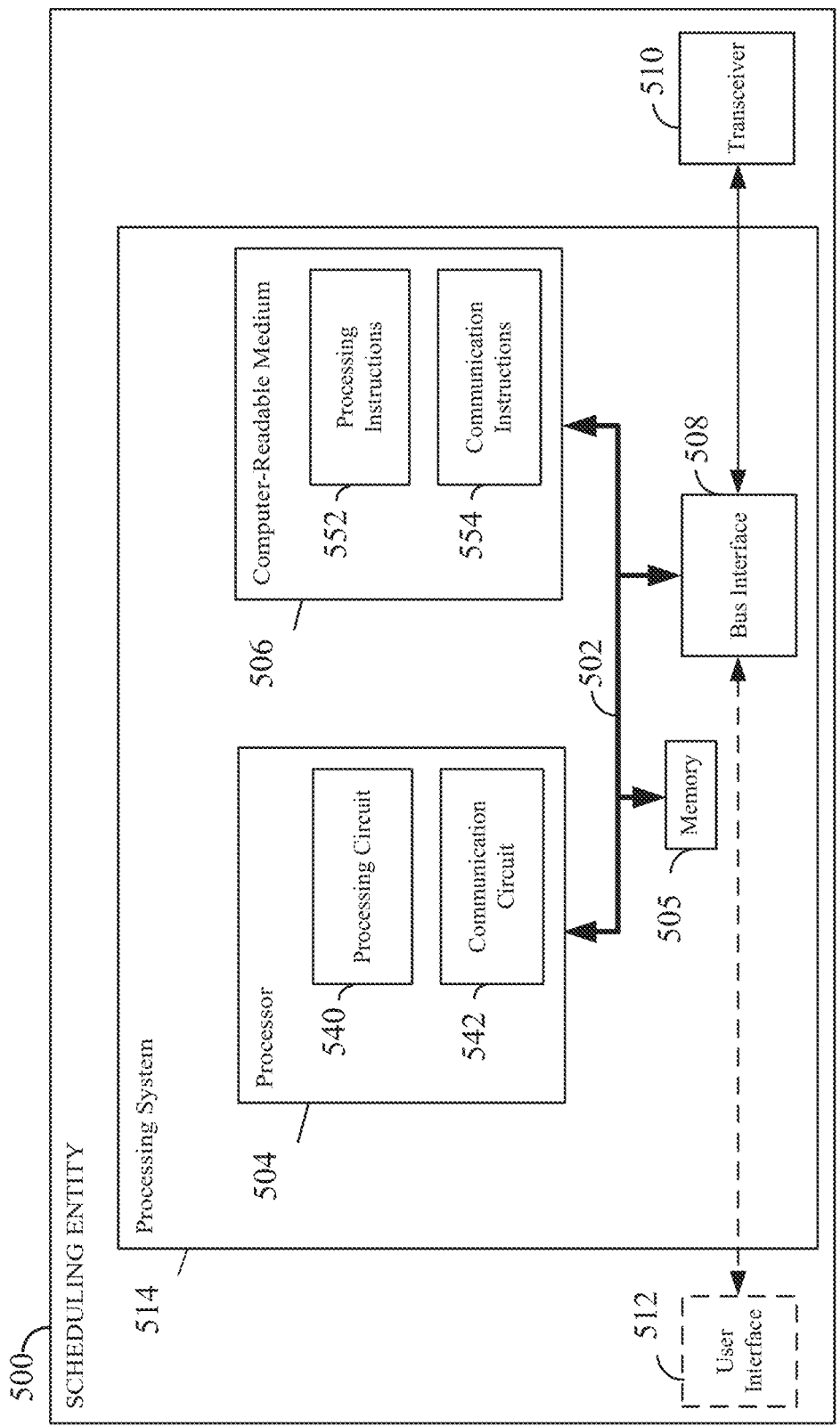
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514. For example, the scheduling entity 500 may be a user equipment (UE) as illustrated in any one or more of FIGS. 1, and/or 2. In another example, the scheduling entity 500 may be a base station as illustrated in any one or more of FIGS. 1, and/or 2.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures described below and illustrated in FIGS. 7-14.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include circuitry (e.g., a processing circuit 540 and a communication circuit 542) configured to implement one or more of the functions and procedures described in relation to FIGS. 7-14.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software (e.g., processing instructions 552 and communication instructions 554) configured to implement one or more of the functions and procedures described in relation to FIGS. 7-14.

Figure 6:
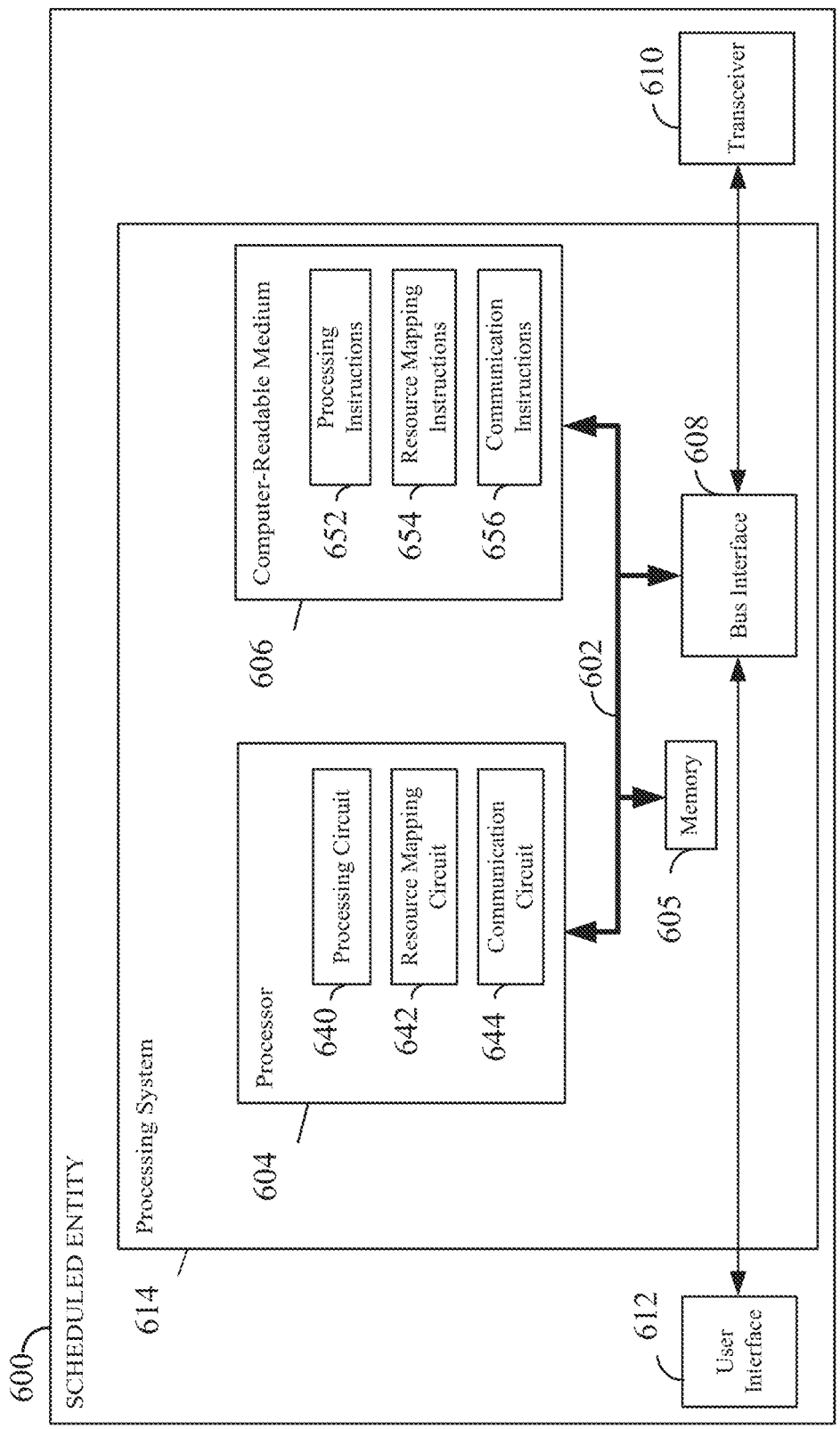
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1 and/or 2.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes and functions described and illustrated in relation to FIGS. 7-14.

In some aspects of the disclosure, the processor 604 may include circuitry (e.g., a processing circuit 640, a resource mapping circuit 642, and a communication circuit 644) configured for various functions and procedures described in relation to FIGS. 7-14. The processing circuit 640 may be configured to perform various data processing functions used in wireless communication as described in this disclosure. The resource mapping circuit 642 may be configured to perform various functions to map modulated symbols (e.g., modulated UCI symbols or information) to REs of an uplink channel (e.g., PUSCH). The communication circuit 644 may be configured to perform various functions to transmit data in an uplink channel (e.g., PUSCH) or receive data in a download channel (e.g., PDCCH or PDCCH). In some examples, the communication circuit 644 may include the resource mapping circuit 642. In some examples, the resource mapping circuit 642 and the communication circuit 644 may be implemented by the same circuitry that provides the functions of both circuits.

In one or more examples, the computer-readable storage medium 606 may include software (e.g., processing instructions 652, resource mapping instructions 654, and communication instructions 656) configured to implement one or more of the functions and procedures described in relation to FIGS. 7-14.

Some aspects of the present disclosure provide various methods for multiplexing simultaneous or substantially simultaneous PUCCH and PUSCH transmissions in a same slot using a unified mapping rule. In some examples, the PUCCH may be piggybacked on resource blocks (RBs) assigned to the PUSCH. The PUCCH carries uplink control information (UCI) that may provide various information to a base station or scheduling entity. For example, UCI may include HARQ-ACK (e.g., ACK and NACK) and channel state information (CSI). An exemplary CSI may include various information, for example, a channel quality indicator (CQI), a precoding matrix indicator (PMI), a precoding type indicator (PTI), a rank indication (RI), etc. In this disclosure, information of the CSI may be divided into two parts: CSI part 1 and CSI part 2. CSI part 1 may include an RI and a CQI for the first codeword, and CSI part 2 may include a PMI and a CQI for the second codeword, and other information such as beam related information. A codeword may represent data before it is formatted for transmission or data after encoding. One or more codewords may be used depending on the conditions of the channel and the use case. In the present disclosure, the HARQ-ACK, CSI part 1, and CSI part 2 are considered different types of UCI when transmitted or piggybacked in a PUSCH using a unified mapping rule.

Figure 7:
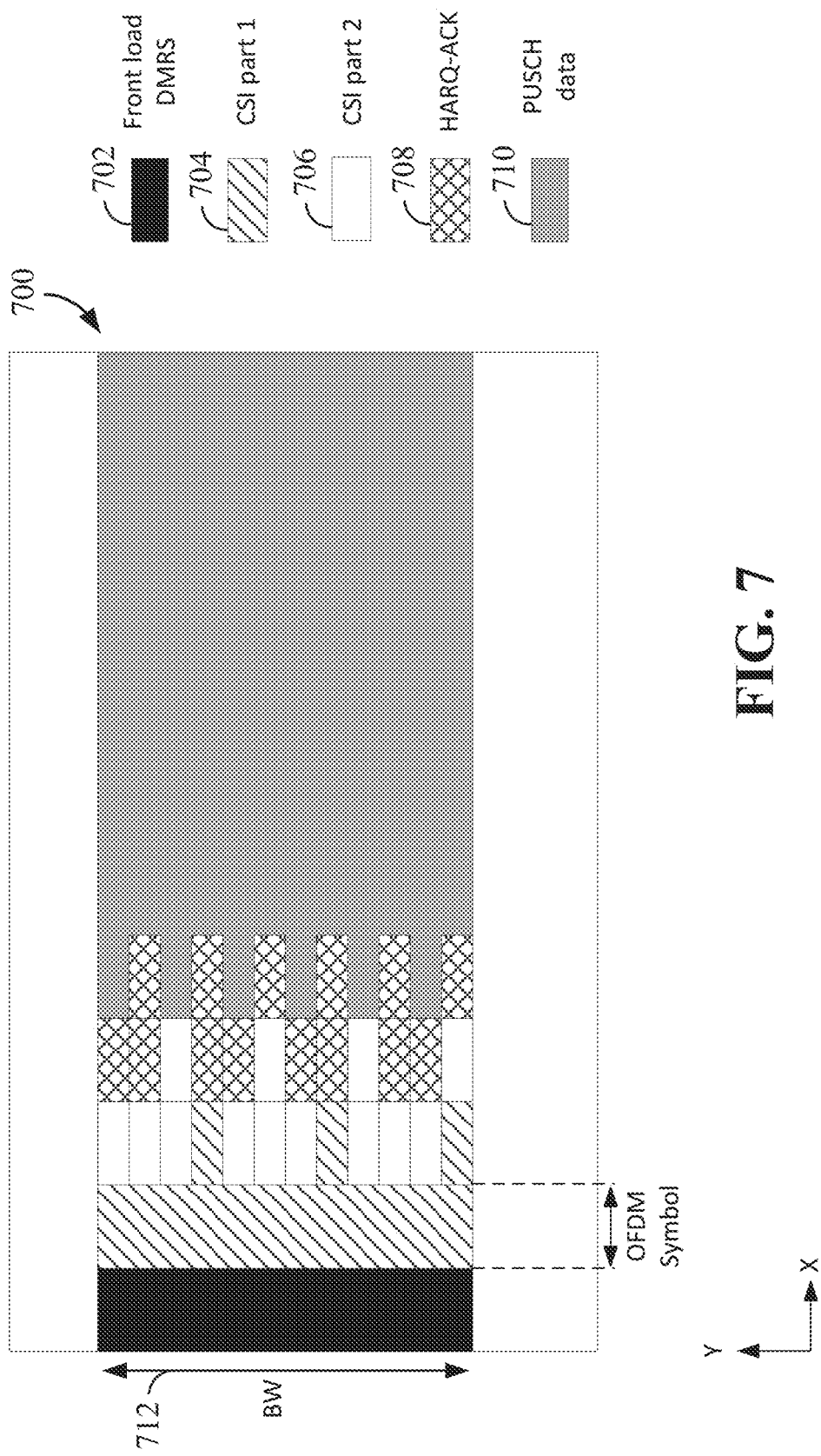
FIG. 7 is a diagram illustrating a unified resource mapping for different types of uplink control information (UCI) on a physical uplink shared channel (PUSCH) according to some aspects of the disclosure.

FIG. 7 is a diagram illustrating a unified resource mapping for transmitting different types of UCI on a PUSCH 700 according to some aspects of the present disclosure. This mapping allows different types of UCI to be piggybacked on a PUSCH. In this example, a unified UCI-to-RE mapping rule is applied to map the UCI to certain REs of a PUSCH regardless of UCI type (e.g., HARQ-ACK, CSI part 1, and CSI part 2), except that different UCI types can be mapped to different OFDM symbols. FIG. 7 illustrates an exemplary PUSCH 700 that is assigned certain time-frequency resources (e.g., RBs 408) in a slot. The vertical direction (direction Y in FIG. 7) indicates the frequency domain (e.g., carriers or bandwidth), and the horizontal direction (direction X in FIG. 7) indicates the time domain (e.g., OFDM symbols).

In the PUSCH 700, front-loaded DMRS are mapped to the beginning OFDM symbol(s) 702 (e.g., OFDM symbol 0). The unified mapping rule maps the different UCI types to the OFDM symbols following a certain sequence in the time domain. For example, the unified mapping rule first maps the CSI part 1 to OFDM symbols 704 after the front-loaded DMRS, followed by the CSI part 2 (if it exists) mapped to OFDM symbols 706, and then followed by the HARQ-ACK (e.g., ACK and NACK) mapped to OFDM symbols 708. Other OFDM symbols 710 may be mapped to PUSCH data. In this example, the CSI part 1 is mapped to all the REs at the second OFDM symbol and some REs of the third OFDM symbol. Then, the CSI part 2 is mapped to some REs at the third OFDM symbol and some REs at the fourth OFDM symbols. After mapping the CSI part 1 and CSI part 2, the HARQ-ACK is mapped to some REs at the fourth OFDM symbol and some REs at the fifth OFDM symbol. In this example, locating the CSI before (earlier in the time domain) the HARQ-ACK in the slot allows early CSI decoding at the base station.

The unified mapping rule also maps the modulated UCI symbols of different UCI types to the OFDM symbols following a certain sequence in the frequency domain. The UCI information may be modulated to create a number of modulated UCI symbols that may be mapped to the OFDM symbol. For example, the same unified mapping rule is used to map the UCI part 1, UCI part 2, and HARQ-ACK to the OFDM symbols. In each OFDM symbol i, the modulated UCI symbols (e.g., CSI part 1, CSI part 2, or HARQ-ACK) are mapped to REs that evenly span over the PUSCH assigned bandwidth 712 in a distributed fashion according to a predetermined step size. In some examples, each modulated symbol may be mapped to one RE. The step size (distance in frequency domain) between the distributed REs at any OFDM symbol i can be determined using equation 1 as follows:

$$\text{Step size} = \text{ceiling}\left(\frac{\text{number of available } REs \text{ in the } OFDM \text{ symbol}}{\text{remaining number of modulated symbols}}\right) \quad (1)$$

The step size refers to the subcarrier spacing between the mapped REs in the OFDM symbol i. A step size of 1 means that the mapped REs are adjacent to each other in the frequency domain. In the illustrated example, the number of available REs within the assigned bandwidth 712 is 12 (i.e., 12 subcarriers) in an OFDM symbol. The ceiling function chooses the next integer value greater than the ratio of "number of available REs in the OFDM symbol" to "remaining number of modulated symbols." The remaining number of modulated symbols refers to the unmapped modulated UCI symbols (e.g., CSI part 1, CSI part 2, or HARQ-ACK).

Referring to FIG. 7, after the front-loaded DMRS, CSI part 1 is mapped first starting at the second OFDM symbol. In this example, CSI part 1 may have a total of 15 modulated symbols. According to the ceiling equation described above, the step size can be determined to be 1 (i.e., ceiling (12/15)). Because the step size is 1, 12 modulated symbols of CSI part 1 are mapped to the 12 REs at the second OFDM symbol.

The three (i.e., 15-12) remaining modulated symbols of CSI part 1 can be mapped to the third OFDM symbol using the same ceiling equation to determine the step size. In this case, the step size is 4 (i.e., ceiling (12/3)). Therefore, the remaining three modulated symbols of CSI part 1 can be evenly mapped to the REs of the third OFDM symbol. In this particular case, one modulated CSI symbol is mapped for every 4 REs (i.e., step size 4) of the third OFDM symbol. That is, the three remaining CSI part 1 symbols are evenly distributed among the 12 REs of the third OFDM symbol.

In a similar fashion, the modulated symbols of CSI part 2 and HARQ-ACK can be mapped to the corresponding OFDM symbols using the same unified mapping rule. For example, nine modulated symbols of CSI part 2 are mapped to the third OFDM symbol, and four modulated symbols of CSI part 2 are mapped to the fourth OFDM symbol. Then, eight modulated symbols of HARQ-ACK are mapped to the fourth OFDM symbol, and six modulated symbols of HARQ-ACK are mapped to the fifth OFDM symbol. Using the unified mapping rule, the CSI part 1, CSI part 2, and HARQ-ARK are evenly distributed in the frequency domain in the corresponding symbols. Moreover, the different types of UCI may be interleaved in the frequency domain among the REs of an OFDM symbol.

Figure 8:
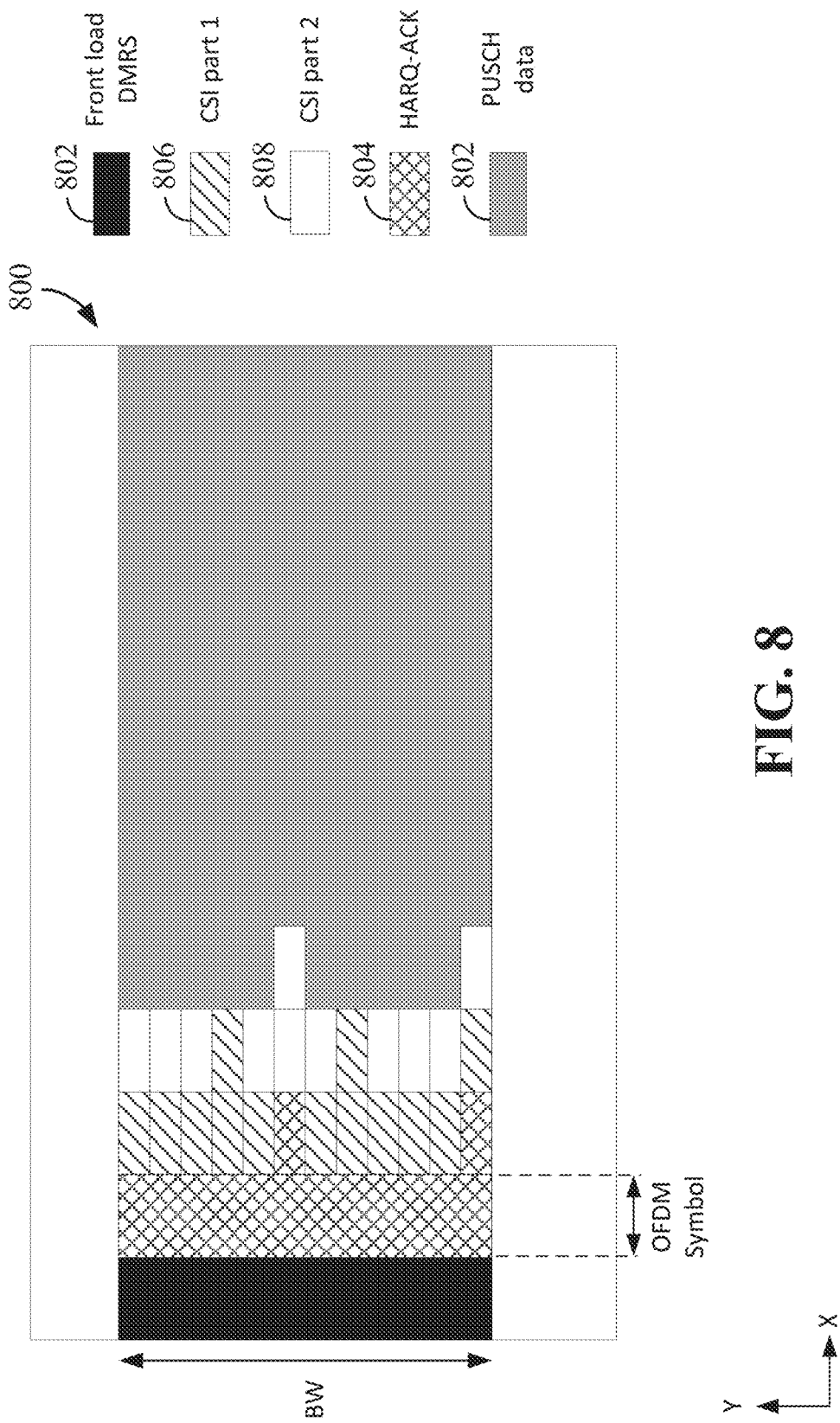
FIG. 8 is a diagram illustrating another unified resource mapping for different types of UCI on a PUSCH according to some aspects of the disclosure.

FIG. 8 is a diagram illustrating another unified resource mapping for transmitting different types of UCI on a PUSCH 800 according to some aspects of the present disclosure. This mapping is made using a unified mapping rule similar to the unified mapping rule described above in relation to FIG. 7. Front-loaded DMRS is mapped to beginning PUSCH symbol(s) 802. The difference between the mapping rules of FIGS. 7 and 8 is that the HARQ-ACK is mapped to the PUSCH symbols 804 first, followed by mapping the CSI part 1 to later OFDM symbols 806, then followed by the CSI part 2 mapped to even later OFDM symbols 808.

In the time domain, the unified mapping rule maps the HARQ-ACK to one or more OFDM symbols 804 after the front-loaded DMRS, followed by the CSI part 1, and followed by the CSI part 2 (if it exists). Locating the HARQ-ACK before the CSI in the slot, and thus, closer in time to the DMRS, can provide better channel estimation for the HARQ-ACK. In the frequency domain, the unified mapping rule may map the HARQ-ACK, UCI part 1, and UCI part 2 using the same procedure described above in relation to FIG. 7.

In some aspects of the disclosure, the scheduling entity (e.g., a base station, eNB, or gNB) may dynamically change the unified mapping rule of the UCI (e.g., CSI part 1, part 2, and HARQ-ACK) using RRC signaling or a high layer message. For example, the scheduling entity may select one of the mapping rules illustrated in FIG. 7 or 8 for a certain slot and transmit a corresponding RRC message to notify the UEs. If the scheduling entity desires to provide better protection to the CSI, the scheduling entity may choose a mapping rule that places the CSI part 1 earlier in the slot. If the scheduling entity desires to provide better protection and/or channel estimation to the HARQ-ACK, the scheduling entity may choose the mapping rule that places the HARQ-ACK earlier in the slot.

In some aspects of the disclosure, the same unified resource mapping rule may be applied to piggyback the UCI on the PUSCH, regardless whether frequency hopping is enabled or disabled for the PUSCH transmission. When frequency hopping is enabled, the PUSCH may be transmitted in different frequency bands or subcarriers in different time periods or slots (e.g., frequency hopping).

Figure 9:
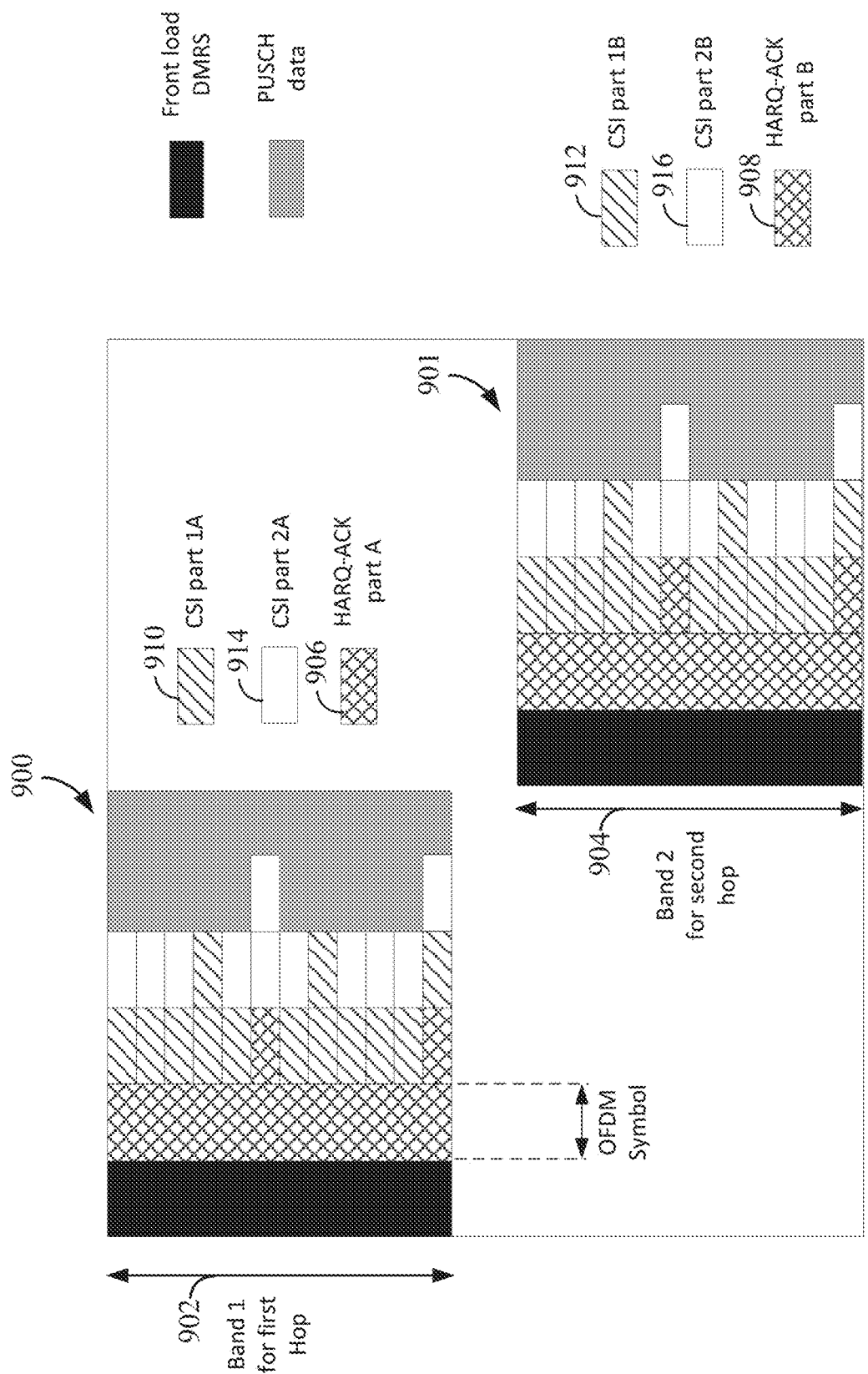
FIG. 9 is a diagram illustrating a unified resource mapping for different types of UCI on a PUSCH with frequency hopping according to some aspects of the disclosure.

FIG. 9 is a diagram illustrating a unified resource mapping for transmitting different types of UCI on a PUSCH with frequency hopping enabled according to some aspects of the present disclosure. In this example, a first portion 900 of the PUSCH is carried in a first frequency band 902, and a second portion 901 of the PUSCH is carried in a second frequency band 904. The DMRS, CSI part 1, CSI part 2, HARQ-ACK, and PUSCH modulated symbols are evenly divided into the two PUSCH portions.

For example, the HARQ-ACK modulated symbols are divided into HARQ part A 906 and HARQ part B 908. HARQ part A is mapped to the first hop, and HARQ part B is mapped to the second hop. HARQ-ACK mapping in each hop may follow the same unified mapping rule for the HARQ-ACK as described above in FIGS. 8 and 9 without frequency hopping.

Similarly, CSI part 1 modulated symbols can be divided into CSI part 1A 910 and CSI part 1B 912. CSI part 2 modulated symbols can be divided into CSI part 2A 914 and CSI part 2B 916. In this example, CSI part 1A and CSI part 2A are mapped to the first hop, and CSI part 1B and CSI part 2B are mapped to the second hop. CSI mapping in each hop may follow the same unified mapping rule for CSI as described above in FIGS. 8 and 9 without frequency hopping.

Figure 10:
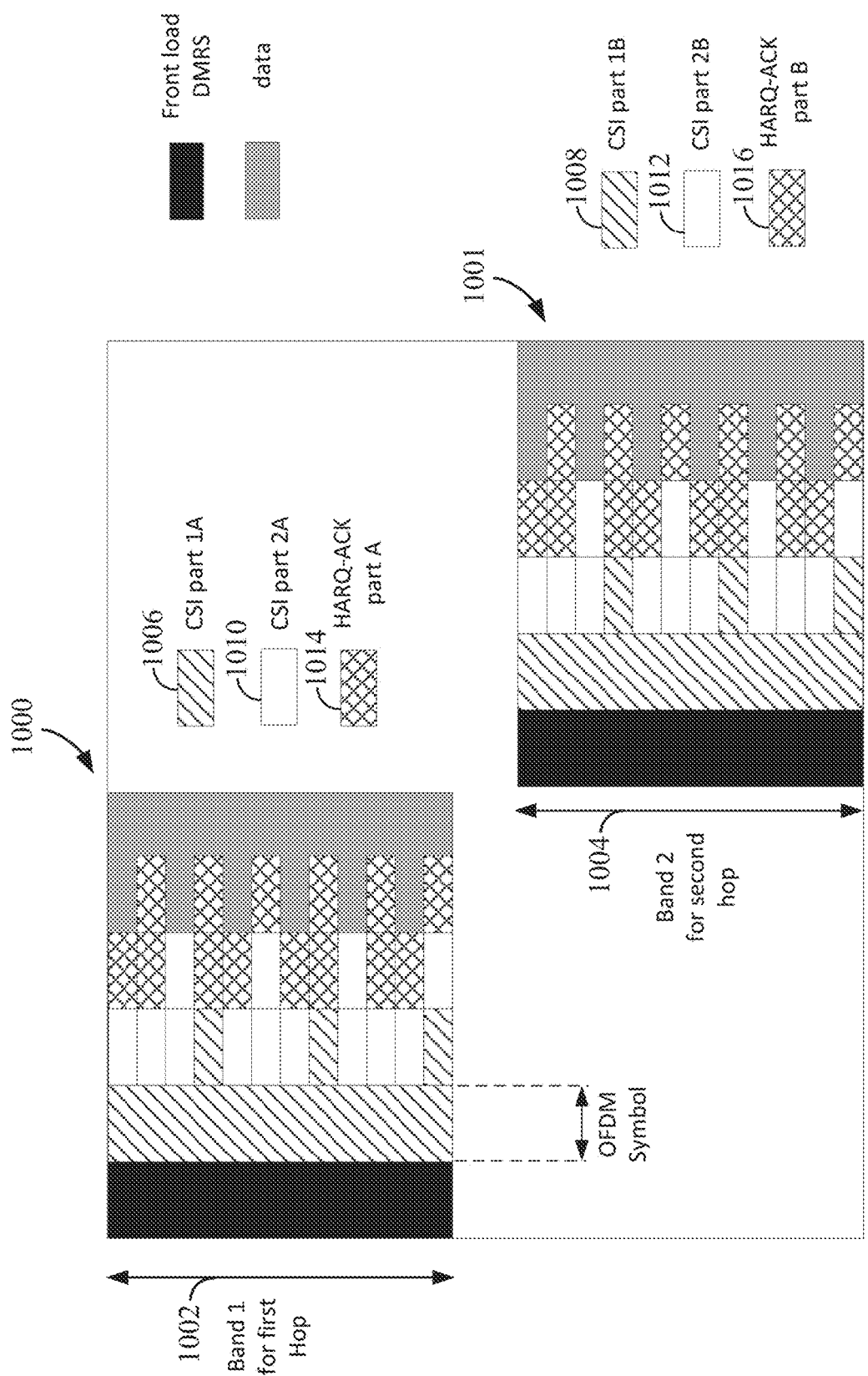
FIG. 10 is a diagram illustrating another unified resource mapping for different types of UCI on a PUSCH with frequency hopping according to some aspects of the disclosure.

FIG. 10 is a diagram illustrating another unified resource mapping for transmitting different types of UCI on a PUSCH with frequency hopping enabled according to some aspects of the present disclosure. In this example, a first portion 1000 of the PUSCH is carried in a first frequency band 1002, and a second portion 1001 of the PUSCH is carried in a second frequency band 1004. The DMRS, CSI part 1, CSI part 2, HARQ-ACK, and PUSCH modulated symbols are evenly divided into the two PUSCH portions. This mapping is different from the mapping of FIG. 9 in the order of the mapping the CSI part 1, CSI part 2, and HARQ-ACK. In this particular example, CSI part 1 is mapped to the PUSCH first, followed by CSI part 2, and then followed by HARQ-ACK. Similar to the mappings described above without frequency hopping, a unified mapping rule is used to map the CSI and HARQ modulated symbols to the PUSCH regardless of frequency hopping.

CSI part 1 modulated symbols can be divided into CSI part 1A 1006 and CSI part 1B 1008. CSI part 2 modulated symbols can be divided into CSI part 2A 1010 and CSI part 2B 1012. In this example, CSI part 1A and CSI part 2A are mapped to the first hop 1002, and CSI part 1B and CSI part 2B are mapped to the second hop 1004. HARQ-ACK modulated symbols are divided into HARQ part A 1014 and HARQ part B 1016. HARQ part A is mapped to the first hop, and HARQ part B is mapped to the second hop.

Figure 11:
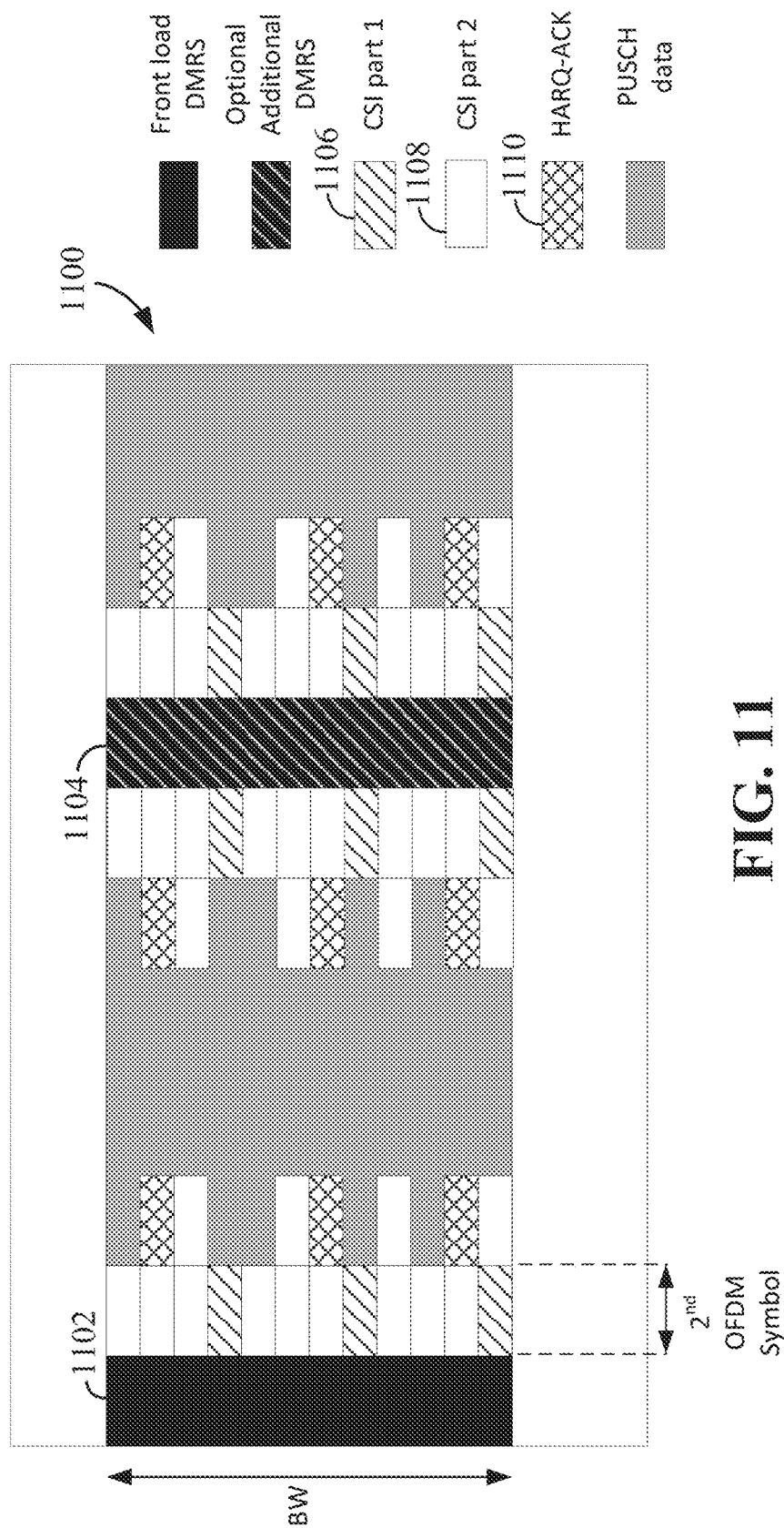
FIG. 11 is a diagram illustrating a unified resource mapping for different types of UCI on a PUSCH with additional demodulation reference signal (DMRS) symbols according to some aspects of the disclosure.

FIG. 11 is a diagram illustrating a unified resource mapping for transmitting different types of UCI on a PUSCH 1100 with extra DMRS symbols according to some aspects of the present disclosure. A scheduling entity (e.g., base station) can configure the PUSCH 1100 to have more than one DMRS symbol. In this example, in addition to the frontloaded DMRS 1102, the PUSCH 1100 has an additional DMRS 1104. Even with multiple DMRS configured, the base station may use a unified UCI mapping rule to piggyback the UCI on the PUSCH 1100 regardless of UCI types (e.g., HARQ-ACK, CSI type 1 and CSI type 2) with or without enabling frequency hopping.

Referring to FIG. 11, in one example, the CSI part 1 is mapped first followed by the CSI part 2, and followed by the HARQ-ACK. In the time domain, the CSI part 1 is mapped to one or more OFDM symbols 1106 after the front-loaded DMRS 1102 and around the additional DMRS 1104 using a unified mapping rule similar to those described above in relation to FIGS. 7 and 8. In this case, the modulated symbols of CSI part 1 may be evenly divided into three groups (e.g., 3 modulated symbols in each group). A first group of CSI part 1 modulated symbols are mapped to the REs of the second OFDM symbol. A second group of CSI part 1 modulated symbols are mapped to the REs of the OFDM symbol(s) before the additional DMRS 1104. A third group of CSI part 1 modulated symbols are mapped to the REs of the OFDM symbol(s) after the additional DMRS 1104.

The same unified mapping rule may map the CSI part 2 (if exists) modulated symbols to the PUSCH REs 1108 and followed by mapping the HARQ-ACK modulated symbols to the PUSCH REs 1110. In this example, locating the CSI ahead of the HARQ-ACK in a slot allows early CSI decoding at the base station, hence providing better protection to the CSI. The mapping direction in the time domain depends on the relative positions between the DMRS and starting OFDM symbol for mapping the UCI symbols. When the starting position is later than (i.e., right side in FIG. 11) the corresponding DMRS, the mapping direction proceeds to the later OFDM symbol(s) in the time domain. When the starting position is earlier than (i.e., left side in FIG. 11) the corresponding DMRS, the mapping direction proceeds to the earlier OFDM symbol(s) in the time domain.

In some aspects of the disclosure, the above described unified UCI-to-PUSCH mapping procedures may be extended to other examples with two or more DMRS symbols that may be located in any OFDM symbols in a slot.

Figure 12:
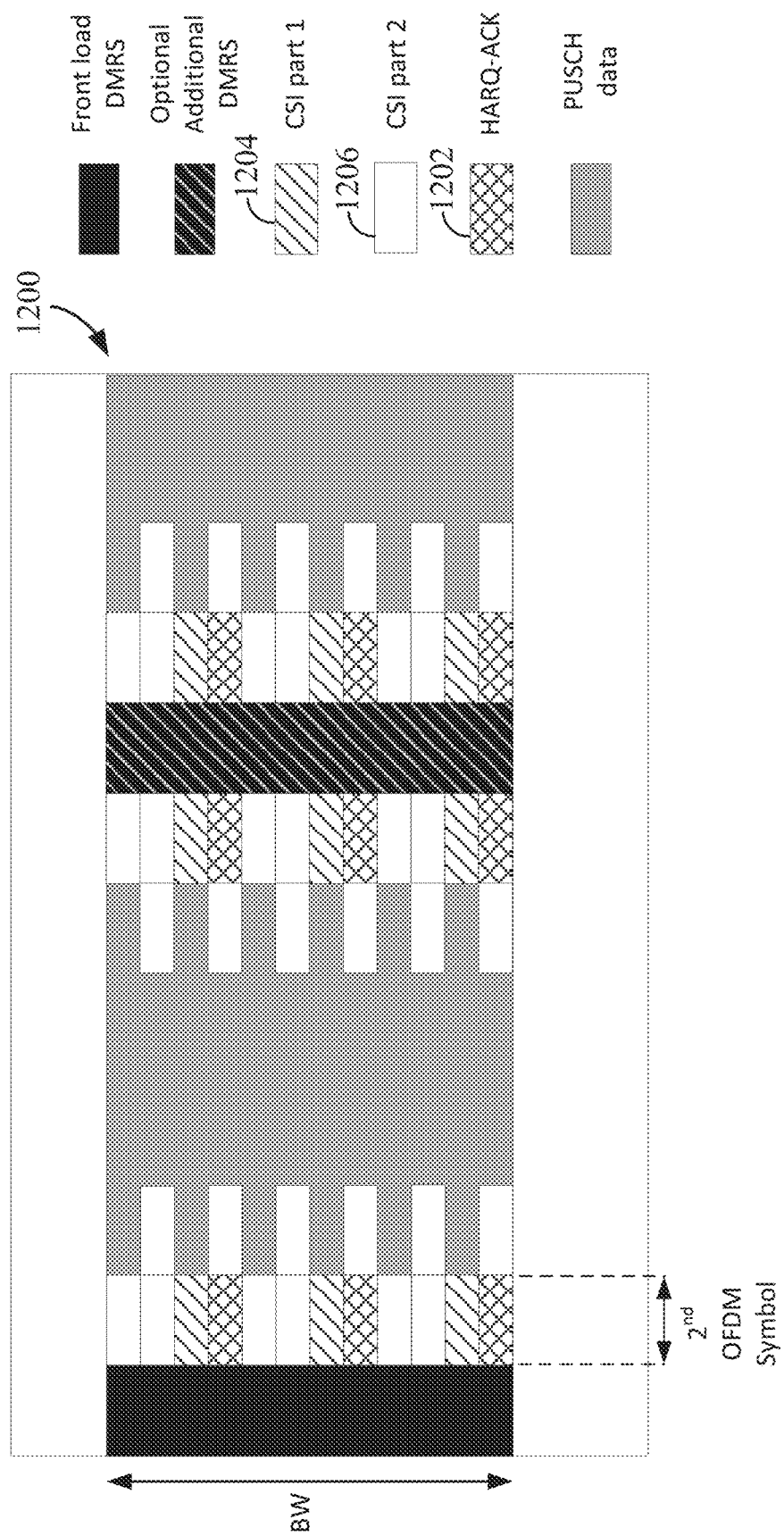
FIG. 12 is a diagram illustrating another unified resource mapping for different types of UCI on a PUSCH with additional DMRS symbols according to some aspects of the disclosure.

FIG. 12 is a diagram illustrating another unified resource mapping for transmitting different types of UCI on a PUSCH 1200 with extra DMRS symbols according to some aspects of the present disclosure. This example is different from that of FIG. 11 in terms of the mapping order of the CSI part 1, CSI part 2, and HARQ-ACK. In this case, the HARQ-ACK is mapped to OFDM symbols 1202 first, followed by mapping the CSI part 1 to OFDM symbols 1204, then mapping the CSI part 2 to OFDM symbols 1206. A unified mapping rule similar to those described above can be used to map the modulated symbols of the HARQ-ACK, CSI part 1, and CSI part 2 to different OFDM symbols. In this example, mapping the HARQ-ACK to earlier OFDM symbols in a slot may provide better channel estimation for the HARQ-ACK.

In the above examples that map the HARQ-ACK first before the CSI part 1 and CSI part 2, different procedures may be used to handle the HARQ-ACK mapping depending on the payload size.

Figure 13:
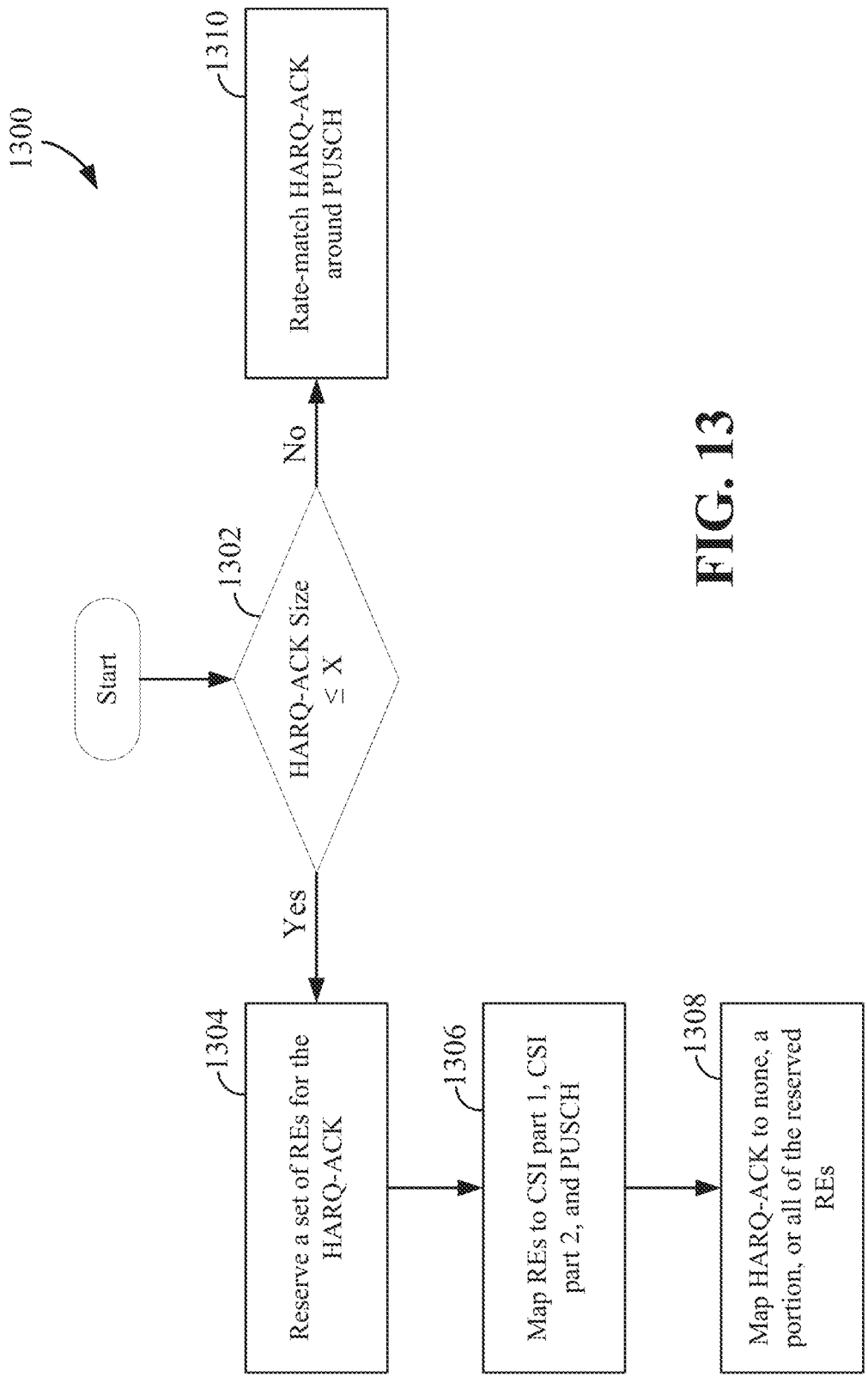
FIG. 13 is a flow chart illustrating a resource mapping procedure 1300 in accordance with some aspects of the present disclosure.

FIG. 13 is a flow chart illustrating a resource mapping procedure 1300 in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 500 illustrated in FIG. 5 or scheduled entity 600 illustrated in FIG. 6. In some examples, the process 1300 may be carried out by any suitable apparatus or means for carrying out the functions or algorithm described below.

At decision block 1302, the process determines whether the HARQ-ACK is equal to or less than a predetermined number X of bits (e.g., 2 bits). When the payload size of the HARQ-ACK is equal to or less than the predetermined number of bits (e.g., 2 bits), the HARQ-ACK may puncture the PUSCH. In this case, at block 1304, the mapping procedure reserves a set of REs for the HARQ-ACK, assuming the payload size of the HARQ-ACK to be the predetermined number of bits (e.g., 2 bits). The reserved REs are not available to the CSI part 1 and CSI part 2 mapping, but they are available to the PUSCH data. At block 1306, the process maps the REs to the CSI part 1 first, followed by CSI part 2 (the reserved REs are not available to CSI part 1 & 2), and followed by PUSCH data. Because the reserved REs are available to the PUSCH, the PUSCH can be mapped to those REs like they are not reserved for the HARQ-ACK. At block 1308, the last step is to map the HARQ-ACK (puncturing PUSCH) on none, a portion, or all of the reserved REs (depending on the actual HARQ-ACK payload size as 0, 1 or 2 bits).

At block 1310, when the payload size of the HARQ-ACK is greater than the predetermined number X of bits (e.g., 2 bits), the mapping rule can rate-match the HARQ-ACK around the PUSCH. Therefore, there is no need to reserve RE for the HARQ-ACK. In this case, all UCI types (e.g., HARQ-ACK, CSI part 1, CSI part 2) can rate-match the PUSCH. For example, the order of RE mapping may be: HARQ-ACK first followed by the CSI part 1 and CSI part 2, and followed by PUSCH, in this order.

Figure 14:
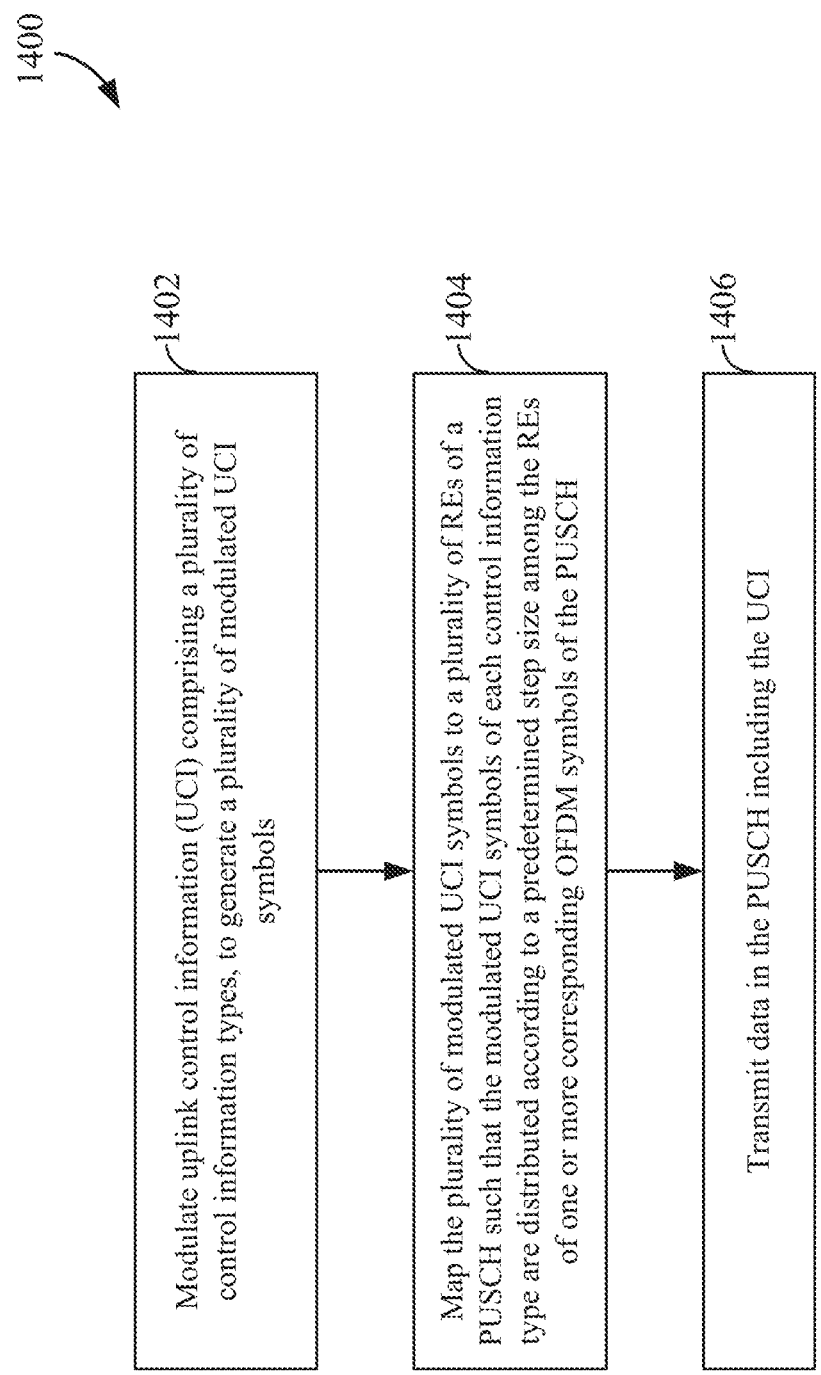
FIG. 14 is a flow chart illustrating an exemplary process for transmitting UCI piggybacked on a PUSCH using a unified mapping rule regardless of UCI type according to some aspects of the disclosure.

FIG. 14 is a flow chart illustrating an exemplary process 1400 for transmitting UCI piggybacked on a PUSCH using a unified mapping rule regardless of UCI type in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 500 illustrated in FIG. 5 or scheduled entity 600 illustrated in FIG. 6. In some examples, the process 1400 may be carried out by any suitable apparatus or means for carrying out the functions or algorithm described below.

At block 1402, a wireless device modulates UCI that include a plurality of control information types, to generate a plurality of modulated UCI symbols. For example, the UCI may include HARQ-ACK (e.g., ACK and NACK), CSI part 1 and CSI part 2, as described above. The wireless device may utilize the communication circuit 644 of FIG. 6 to modulate the UCI At block 1404, the wireless device maps the plurality of modulated UCI symbols to a plurality of resource elements (REs) of a PUSCH according to a unified mapping rule that distributes the modulated UCI symbols of each control information type among the REs of one or more corresponding OFDM symbols of the PUSCH. Each type of modulated UCI symbols may be distributed among the REs of each OFDM symbols according to a predetermined step size, which may be determined as described above using equation 1. For example, the wireless device may utilize the resource mapping circuit 642 of FIG. 6 to map the modulated UCI symbols to the PUSCH using any of the unified mapping rules described above in relation to FIGS. 7-13.

At block 1406, the wireless device may transmit data in the PUSCH including the UCI. For example, the wireless device may utilize the communication circuit 644 to transmit the PUSCH with the piggybacked UCI. In some examples, when frequency hopping is enabled, the wireless device maps the HARQ-ACK, CSI part 1, and CSI part 2 to the OFDM symbols of the PUSCH in a predetermined order in a time domain. For each OFDM symbol, the wireless device evenly distributes modulated symbols of one or more of the HARQ-ACK, CSI part 1, and CSI part 2 mapped to the OFDM symbols, in a frequency domain.

Figure 15:
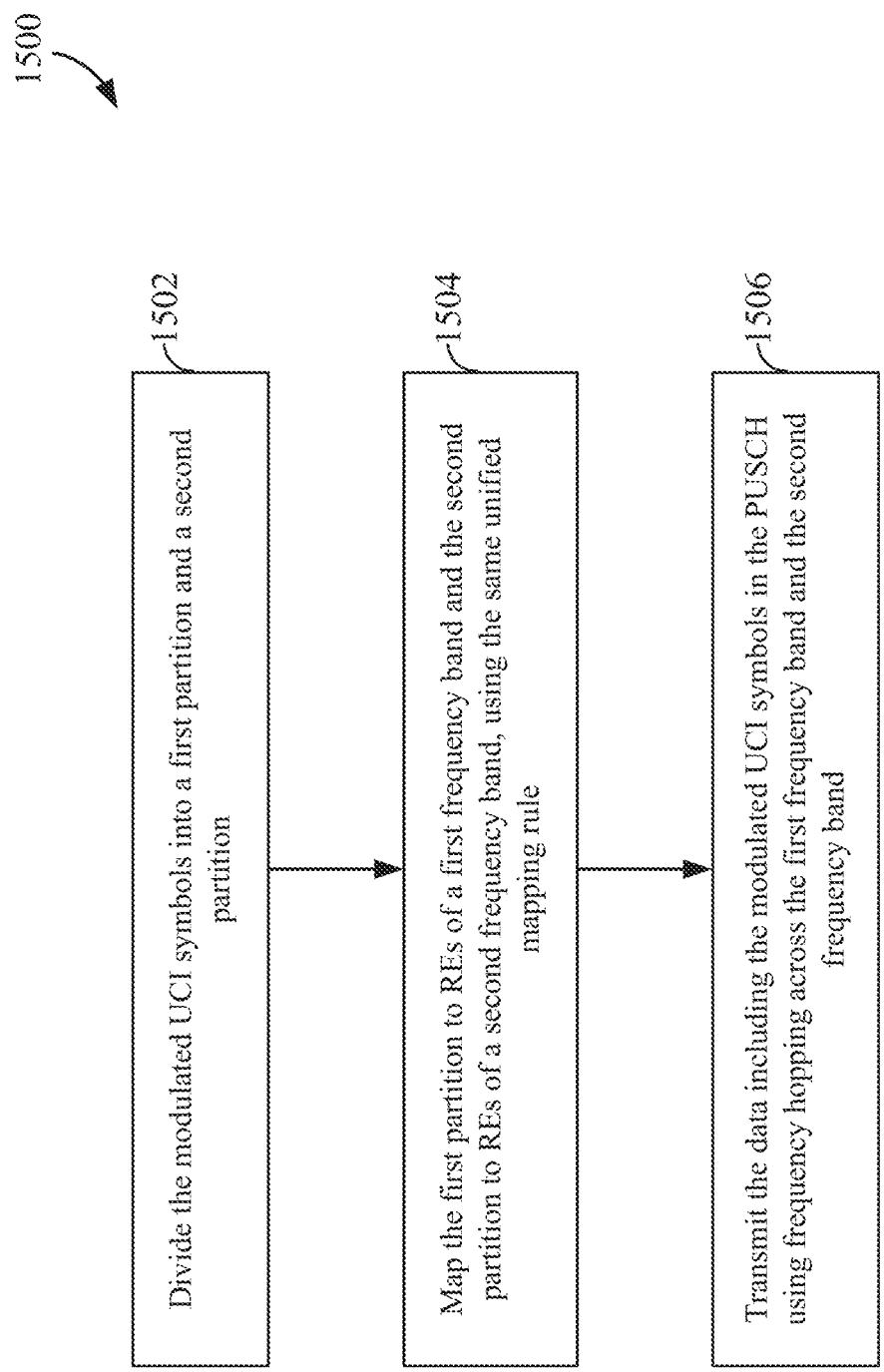
FIG. 15 is a flow chart illustrating an exemplary process for transmitting UCI piggybacked on a PUSCH using frequency hopping according to some aspects of the disclosure.

FIG. 15 is a flow chart illustrating an exemplary process 1500 for transmitting UCI piggybacked on a PUSCH using frequency hopping in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 500 illustrated in FIG. 5 or scheduled entity 600 illustrated in FIG. 6. In some examples, the process 1500 may be carried out by any suitable apparatus or means for carrying out the functions or algorithm described below.

At block 1502, the wireless device may divide the modulated UCI symbols into a first partition and a second partition. For example, the first partition may include the CSI part 1A, CSI part 2A, and HARQ-ACK part A shown in FIG. 9 or 10. The second partition may include the CSI part 1B, CSI part 2B, and HARQ-ACK part B shown in FIG. 9 or 10. At block 1504, the wireless device may map the first partition to REs of a first frequency band and the second partition to REs of a second frequency band, using the same unified mapping rule. For example, the first frequency band and second frequency band may be the band 1 and band 2 illustrated in FIG. 9 or 10. At block 1506, the wireless device may transmit the data including the modulated UCI symbols in the PUSCH using frequency hopping across the first frequency band and the second frequency band.

In one configuration, the apparatus 500 and/or 600 for wireless communication includes various means configured to perform the functions and procedures described throughout this disclosure.

Of course, in the above examples, the circuitry included in the processor 504 or 604 is merely provided as an example, and other means for carrying out the described functions may be included within various aspects of the present disclosure, including but not limited to the instructions stored in the computer-readable storage medium 506 or 606, or any other suitable apparatus or means described in any one of the FIGS. 1 and/or 2, and utilizing, for example, the processes, procedures, and/or algorithms described herein in relation to FIGS. 7-15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
    modulating uplink control information (UCI) of a plurality of control information types to generate a plurality of modulated UCI symbols, each modulated UCI symbol carrying UCI of a corresponding one of the control information types;
    mapping the plurality of modulated UCI symbols to a plurality of resource elements of a plurality of orthogonal frequency division multiplexing (OFDM) symbols of a physical uplink shared channel (PUSCH), the mapping comprising, for each of the control information types, distributing the respective modulated UCI symbols to resource elements of one or more corresponding OFDM symbols of the plurality of OFDM symbols based on a step size between adjacent ones of the respective resource elements for each respective OFDM symbol, the step size for the respective OFDM symbol being a function of a number of available resource elements in the respective OFDM symbol and a number of remaining modulated UCI symbols of the respective control information type; and
    transmitting the PUSCH including the plurality of resource elements to which the modulated UCI symbols were mapped.

2. The method of claim 1, wherein the UCI includes:
    first UCI of a first control information type of the plurality of control information types that comprises a hybrid automatic repeat request acknowledgment (HARQ-ACK),
    second UCI of a second control information type of the plurality of control information types that comprises a first portion of channel state information (CSI), and
    third UCI of a third control information type of the plurality of control information types that comprises a second portion of CSI.

3. The method of claim 2, wherein resources elements of the plurality of resource elements in which the first UCI, the second UCI and the third UCI are mapped are multiplexed in a frequency domain in one or more of the OFDM symbols.

4. The method of claim 3, wherein the mapping comprises:
    interleaving one or more of the resource elements in which the first UCI is mapped to one or more of the resource elements in which the second UCI is mapped and to one or more of the resource elements in which the third UCI is mapped in one or more of the OFDM symbols.

5. The method of claim 2, wherein the resource elements to which the first UCI is mapped occur earlier in a time domain than the resource elements to which the second UCI and the third UCI are mapped.

6. The method of claim 2, wherein the resource elements to which the second UCI is mapped occur earlier in the time domain than the resource elements to which the third UCI is mapped.

7. The method of claim 1, wherein the PUSCH further comprises a first demodulation reference signal (DMRS) and a second DMRS, and wherein the mapping further comprises:
    dividing the modulated UCI symbols of each control information type into a plurality of groups; and
    mapping each group of the modulated UCI symbols to one or more OFDM symbols starting at an OFDM symbol adjacent to the first DMRS or the second DMRS.

8. The method of claim 7, wherein the first DMRS is front-loaded in the PUSCH, the first DMRS and the second DMRS are separated by one or more OFDM symbols, and the mapping further comprises:
    mapping a first group of the UCI symbols to OFDM symbols adjacent to the first DMRS;
    mapping a second group of the UCI symbols to OFDM symbols adjacent to and earlier in time than the second DMRS; and
    mapping a third group of the UCI symbols to OFDM symbols adjacent to and later in time than the second DMRS.

9. A method of wireless communication, comprising:
    modulating uplink control information (UCI) comprising a plurality of control information types, to generate a plurality of modulated UCI symbols;
    mapping the plurality of modulated UCI symbols to a plurality of resource elements of a physical uplink shared channel (PUSCH) such that the modulated UCI symbols of each control information type are distributed according to a predetermined step size among the resource elements of one or more corresponding orthogonal frequency division multiplexing (OFDM) symbols of the PUSCH, the mapping comprising:

dividing the modulated UCI symbols into a first partition and a second partition, and mapping the first partition to resource elements of the plurality of resources elements in a first frequency band and the second partition to resource elements of the plurality of resources elements in a second frequency band; and transmitting the PUSCH, including the plurality of resource elements to which the modulated UCI symbols were mapped and including resource elements to which data is mapped, using frequency hopping across the first frequency band and the second frequency band.

10. An apparatus comprising:

a communication interface configured for wireless communication; and a communication circuit configured to:

modulate uplink control information (UCI) of a plurality of control information types to generate a plurality of modulated UCI symbols, each modulated UCI symbol carrying UCI of a corresponding one of the control information types;

map the plurality of modulated UCI symbols to a plurality of resource elements of a plurality of orthogonal frequency division multiplexing (OFDM) symbols of a physical uplink shared channel (PUSCH), the mapping comprising, for each of the control information types, distributing the respective modulated UCI symbols to resource elements of one or more corresponding OFDM symbols of the plurality of OFDM symbols based on a step size between adjacent ones of the respective resource elements for each respective OFDM symbol, the step size for the respective OFDM symbol being a function of a number of available resource elements in the respective OFDM symbol and a number of remaining modulated UCI symbols of the respective control information type; and transmit the PUSCH including the plurality of resource elements to which the modulated UCI symbols were mapped.

11. The apparatus of claim 10, wherein the UCI includes:

first UCI of a first control information type of the plurality of control information types that comprises a hybrid automatic repeat request acknowledgment (HARQ-ACK), second UCI of a second control information type of the plurality of control information types that comprises a first portion of channel state information (CSI), and third UCI of a third control information type of the plurality of control information types that comprises a second portion of CSI.

12. The apparatus of claim 11, wherein resources elements of the plurality of resource elements in which the first UCI, the second UCI and the third UCI are mapped are multiplexed in a frequency domain in one or more of the OFDM symbols.

13. The apparatus of claim 12, wherein to, map the modulated UCI symbols, the communication circuit is further configured to:

interleave one or more of the resource elements in which the first UCI is mapped to one or more of the resource elements in which the second UCI is mapped and to one or more of the resource elements in which the third UCI is mapped in one or more of the OFDM symbols.

14. The apparatus of claim 11, wherein the resource elements to which the first UCI is mapped occur earlier in a time domain than the resource elements to which the second UCI and the third UCI are mapped.

15. The apparatus of claim 11, wherein the resource elements to which the second UCI is mapped occur earlier in the time domain than the resource elements to which the third UCI is mapped.

16. The apparatus of claim 10, wherein the PUSCH further comprises a first demodulation reference signal (DMRS) and a second DMRS, and wherein the communication circuit is further configured to:

divide the modulated UCI symbols of each control information type into a plurality of groups; and map each group of the modulated UCI symbols to one or more OFDM symbols starting at an OFDM symbol adjacent to the first DMRS or the second DMRS.

17. The apparatus of claim 16, wherein the first DMRS is front-loaded in the PUSCH, the first DMRS and the second DMRS are separated by one or more OFDM symbols, and the communication circuit is further configured to:

map a first group of the UCI symbols to OFDM symbols adjacent to the first DMRS;

map a second group of the UCI symbols to OFDM symbols adjacent to and earlier in time than the second DMRS; and map a third group of the UCI symbols to OFDM symbols adjacent to and later in time than the second DMRS.

18. An apparatus comprising:

a communication interface configured for wireless communication; and a communication circuit configured to:

modulating uplink control information (UCI) comprising a plurality of control information types, to generate a plurality of modulated UCI symbols;

map the plurality of modulated UCI symbols to a plurality of resource elements of a physical uplink shared channel (PUSCH) such that the modulated UCI symbols of each control information type are distributed according to a predetermined step size among the resource elements of one or more corresponding orthogonal frequency division multiplexing (OFDM) symbols of the PUSCH, wherein to map the modulated UCI symbols, the communication circuit is configured to:

divide the modulated UCI symbols into a first partition and a second partition, and map the first partition to resource elements of the plurality of resources elements in a first frequency band and the second partition to resource elements of the plurality of resources elements in a second frequency band; and transmit the PUSCH, including the plurality of resource elements to which the modulated UCI symbols were mapped and including resource elements to which data is mapped, using frequency hopping across the first frequency band and the second frequency band.

* * * * *